Figure 1:
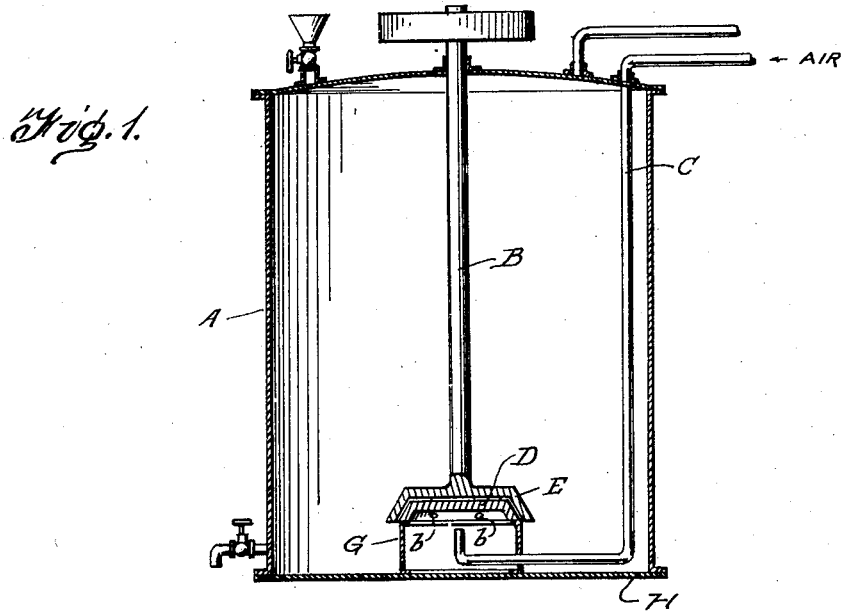

June 9, 1936.  E. VAN THIEL  2,043,940

APPARATUS FOR THE MANUFACTURE OF YEAST

Filed Jan. 19, 1934

Inventor

Emile Van Thiel by

Fooler & Coder

Attorneys

Patented June 9, 1936

2,043,940

UNITED STATES PATENT OFFICE 2,043,940

APPARATUS FOR THE MANUFACTURE OF YEAST

Emile van Thiel, Compiegne, France, assignor to Naamlooze Vennotischap Industrieele Maatschappij Voorheen Noury and van der Lande, Deventer, Netherlands, a company of the Netherlands Application January 19, 1934, Serial No. 707,387
In the Netherlands January 11, 1933

1 Claim. (Cl. 195—142)

The present invention relates to apparatus for preparing yeast. More particularly the present invention relates to methods of preparing aerated yeast, i. e., a method of aerating the mash during the growth of the yeast.

The manufacture of aerated yeast which began several decades ago, constituted a definite advance in the art. However, the earlier methods of aerating the growing yeast involved certain technical difficulties, some of which had not been satisfactorily solved prior to the present invention as will more fully appear hereinafter.

In order to satisfy the oxygen requirements of growing yeast cells, it has become the practice to introduce air into the fermenting liquid containing the growing yeast. In carrying this procedure into effect, it is common practice to first compress air and then conduct it into the yeast producing medium where it is liberated through very small orifices disposed in a set of air conducting tubes or the like, located at the bottom of a container in which the yeast production is taking place. The order of magnitude of the diameters of the said orifices is in some cases approximately 0.2 mm. and when of this size they usually number about 50,000 per square meter of nozzle tubes or the like. This would amount to about 25,000 of such orifices per square meter of tank bottom. However, after escape of the bubbles of compressed air from the orifices, the volume of the bubbles increases up to about 20 cubic mm. The energy requirements for compressing the air to the extent required, amount to about 700 horse power hours per 1,000 kilograms of yeast produced. The disadvantage of this process is that the size of the bubbles (about 20 cubic mm.) as produced in the yeast medium and the velocity of their flow therethrough, precludes sufficiently intimate contact between the said medium and the said bubbles to afford an efficient process. As a result thereof, only a minor fraction of the total air supply was utilized by the yeast medium. Another outstanding disadvantage of the process is that a large amount of alcohol produced in the yeast medium is volatilized and removed therefrom with the escaping air, and lost. The greatest part of the air did however function to eliminate carbon dioxide from the yeast producing medium and to maintain the latter in a state of agitation, thus continuously bringing fresh nutrient matter into contact with the growing yeast.

For the above reasons, it has been generally recognized in the art that it is necessary, to increase the efficiency of the process, to provide air bubbles of very small dimensions in the liquid medium, in order that a large surface of the bubbles be available for contact with the liquid medium containing the yeast and at the same time to reduce the rate of flow of the air bubbles through the liquid medium, but prior to applicant's invention, no one had devised means for accomplishing this result.

It has been found by other investigators that reducing the diameters of the orifices through which the compressed air escapes in the liquid medium, containing the growing yeast, to about 100 to 0.16 microns, resulted in economy in air. Bubbles of air escaping from these orifices resulted in the economization of over 90% of the air, but the power consumption had to be increased to compensate for the increased frictional resistance resulting from the passage of air through the minute orifices. Other technical difficulties arose in this process, such as clogging and infection of the orifices, breakage and other difficulties in sterilizing. For these reasons and others, the method has proved impractical.

It has now been found that an extremely fine division of the air bubbles in the liquid medium containing the yeast may be effected by conducting the air in large bubbles in the liquid medium and thereafter subdividing these bubbles in the same medium by forcing them through an aerating device which also acts as a stirring device. It has been further found that this process results in good agitation of the liquid medium and also results in a much lower power consumption. It has been found that the present method of introducing the air and stirring resulted in the production of a yeast of excellent quality and in excellent yields. The power consumption is approximately 200 horse power hours per 1,000 kilograms of yeast produced and the extremely fine state of the air bubbles necessitates only about 5% to 10% of the quantity of air previously used.

The present invention has resulted from an entirely new line of attack of the problem, as compared with prior investigations, because instead of introducing the air into the liquid medium containing the yeast in the form of extremely small bubbles, the present process is such that large bubbles are introduced and thereafter forced through a stirring device for example a centrifugal stirrer. The rapid rotation of the stirring element causes the air bubbles to be finely divided, as will be more fully explained presently.

Referring to the accompanying drawing the Figure 1 illustrates a preferred modification of the invention.

Figure 2:
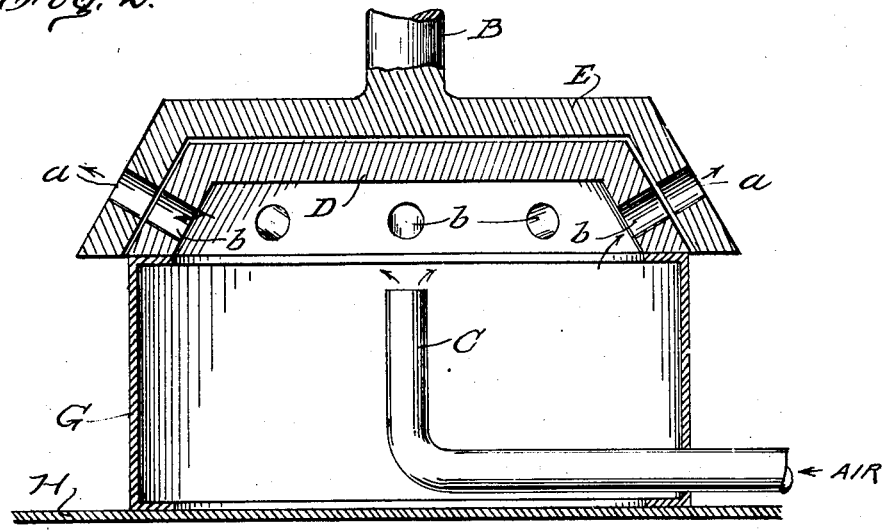

Figure 2 is an enlarged view of the air comminuting structure of Figure 1.

A represents a fermenting tank in which is positioned a rotating shaft B, whose lower end is integral with the rotor E. The ring or downturned flange of the rotor is provided with many (say 25) channels $a$, (see Figure 2). Beneath the rotor is placed the stator D which rests upon supports G, and air is supplied through pipe C. The stator also is provided with many (say 8) channels $b$, in its down-turned flange as shown in the drawing. The stator and the rotor are preferably inverted-dish-shaped members and preferably are arranged so that the stator is nested within the rotor with a slight clearance between the two members as shown in the drawing, that is to say the internal diameter of the rotor is slightly larger than the external diameter of the stator and the rotor is positioned slightly above the stator. The air, introduced through the air pipe C bubbling through the liquid medium containing yeast and yeast food, is caught by the stator. The revolving shaft B with rotor E will suck liquid and air through the channels $a$ and $b$, thereby cutting the big air bubbles into very fine ones.

For a fermenting tank of 25 m$^3$ contents, an air pipe with a diameter of 1 inch is usually sufficient. The diameter of the rotor is approximately 20 inches, and that of the channels $a$ and $b$ 1 inch. The shaft may revolve with 200 revolutions per minute.

A further advantage of the suction produced by the motion of the rotor, is that the pressure of the air does not need to be more than that necessary to compensate the hydrostatic pressure of the liquid in the fermenting tank.

The advantages of the above described process are that the parts of the device coming in contact with the liquid nutrient medium are easily cleaned and sterilized, a large saving in power consumption is effected, an enormous saving in air is accomplished because agitation is provided by the stirring device itself and the air is utilized principally to supply the oxygen to the yeast, much less oil is required to extinguish foam and finally the yield of alcohol, for a given amount of yeast produced, has been increased up to eight times. Furthermore in producing the same quantity of yeast, a better quality results.

This described device and process of aerating liquids may be adapted to all known yeast manufacturing processes, for example, to those processes where all the yeast food is added at the beginning of the process, or to those processes where parts of the yeast food are added during the process. The temperatures to be maintained during the process in the vessel are normal ones known to those skilled in the art.

Only about 5 to 10% of the air heretofore required is needed in the present process to obtain the same yield of yeast.

*Example.*—A fermenting vessel, as described, is filled about two-thirds full with a solution of yeast nutrient. Mother yeast is incorporated and at the same time the aeration is started. During the fermentation additional amounts of liquid yeast nutrient are added in the known manner. The temperature is maintained between 26–33° C. After the total amount of yeast nutrient is added the aeration is continued for about one hour, whereafter the yeast is separated, washed and pressed.

I claim:

An apparatus for propagating yeast in a nutrient liquid medium which comprises a receptacle for containing a bulk of such liquid medium carrying yeast, and means for introducing air into said receptacle at below a nested inverted-dish-shaped stator-rotor combination located in the lower portion of said receptacle, in which there is provided an inverted-dish-shaped stator having perforations in its down-turned flange, and an inverted-dish-shaped rotor of a slightly larger diameter than said stator and being located only slightly above said stator, the inverted-dish-shaped rotor also having perforations in its down-turned flange, the down-turned flange of the rotor surrounding and spaced only slightly away from the down-turned flange of said stator, and means for rotating said rotor at high speed for producing centrifugal comminution of the air into said liquid mixture, whereby a volume of air can be very thoroughly incorporated into the said bulk of nutrient medium, and whereby a small volume of air can serve to aerate a large volume of the liquid mixture with the expenditure of only a small amount of power.

EMILE VAN THIEL.